US011878898B2

(12) United States Patent
de Jong

(10) Patent No.: US 11,878,898 B2
(45) Date of Patent: Jan. 23, 2024

(54) VEHICLE ELEVATOR FOR LIFTING A VEHICLE AND METHOD FOR LIFTING

(71) Applicant: Stertil B.V., Kootstertille (NL)

(72) Inventor: Jurjen Jan de Jong, Kootstertille (NL)

(73) Assignee: Stertil B.V., Kootstertille (NL)

( * ) Notice: Subject to any disclaimer, the term of this patent is extended or adjusted under 35 U.S.C. 154(b) by 0 days.

(21) Appl. No.: 17/517,754

(22) Filed: Nov. 3, 2021

(65) Prior Publication Data

US 2022/0135383 A1 May 5, 2022

(30) Foreign Application Priority Data

Nov. 4, 2020 (NL) ...................................... 2026822

(51) Int. Cl.
*B66F 7/08* (2006.01)
*B66F 7/28* (2006.01)

(52) U.S. Cl.
CPC . *B66F 7/08* (2013.01); *B66F 7/28* (2013.01)

(58) Field of Classification Search
CPC ................................. B66F 7/08; B66F 7/0691
See application file for complete search history.

(56) References Cited

U.S. PATENT DOCUMENTS

| | | | |
|---|---|---|---|
| 5,450,928 | A | 9/1995 | Isogai |
| 2009/0205907 | A1 | 8/2009 | Berends |

FOREIGN PATENT DOCUMENTS

| | | | | | |
|---|---|---|---|---|---|
| CN | 201442827 | U | * | 4/2010 | ............ B66F 7/0666 |
| DE | 102014113301 | A1 | * | 3/2016 | .............. B66F 17/00 |
| FR | 2964377 | A1 | * | 3/2012 | .............. B66F 7/065 |
| RU | 2765183 | C1 | * | 1/2022 | ............ B66F 7/0658 |
| WO | 2007148960 | A1 | | 12/2007 | |
| WO | WO-2010104239 | A1 | * | 9/2010 | ............ B66F 7/0691 |
| WO | 2013062215 | A1 | | 5/2013 | |

OTHER PUBLICATIONS

Machine Translation of RU 2765183.*

* cited by examiner

*Primary Examiner* — Diem M Tran
(74) *Attorney, Agent, or Firm* — The Webb Law Firm

(57) ABSTRACT

The present invention relates to a vehicle elevator for lifting a vehicle and a method for lifting a vehicle. The vehicle elevator includes a carrier configured for lifting the vehicle. The carrier includes a first and a second carrier part each extending in a longitudinal direction and each having a longitudinal central axis and a lifting mechanism configured for raising and lowering the carrier. The lifting mechanism includes a lifting drive with at least one lifting cylinder configured for raising the first and/or second carrier part. The at least one lifting cylinder is mounted at a mounting distance from the longitudinal central axis of the respective carrier part.

20 Claims, 6 Drawing Sheets

VEHICLE ELEVATOR FOR LIFTING A VEHICLE AND METHOD FOR LIFTING

CROSS-REFERENCE TO RELATED APPLICATION

This application claims priority to The Netherlands Patent Application No. 2026822 filed Nov. 4, 2020, the disclosure of which is hereby incorporated by reference in its entirety.

BACKGROUND OF THE INVENTION

Field of the Invention

The present invention relates to a vehicle elevator for lifting a vehicle. Such elevators are often used in workshops for vehicle maintenance, inspection and/or repair.

In practice, vehicle elevators are provided with at least one carrier having a length suitable for carrying a load thereon. Such load can be a vehicle such as a car, bus, or truck. The vehicles can be positioned onto the carrier of the vehicle elevator after which the vehicles can be lifted for repair, inspection, maintenance et cetera. This lifting and subsequent lowering of the carrier is achieved with a lifting mechanism that is positioned under the carrier.

Description of Related Art

EP 2038201 A1 discloses a vehicle elevator with a carrier and a lifting mechanism. This vehicle elevator uses a half-scissor construction having a pull rod and drive cylinder. The extensible drive cylinder is fixedly mounted on a rotation shaft and pull rods are bearing mounted on the rotation shaft, or alternatively, the pull rods are arranged fixedly on the rotation shaft and the extensible drive element is mounted rotatable on the rotation shaft.

Vehicle elevators are often confronted with excessive loads from heavy and/or large vehicles, for example. This provides a bending movement around a longitudinal axis of the vehicle elevator, such that the vehicle elevator tends to bend or rotate inwards. This results in undesired wear of the vehicle elevator that may reduce the lifespan of the vehicle elevator. To prevent this, vehicle elevators are often over-dimensioned. This requires additional material and increases costs, for example.

SUMMARY OF THE INVENTION

The present invention has for its purpose to obviate or at least reduce one or more of the aforementioned problems.

Provided for this purpose is a vehicle elevator according to the present invention wherein the elevator comprising:

- a carrier configured for lifting the vehicle, wherein the carrier comprises a first and a second carrier part each extending in a longitudinal direction and each having a longitudinal central axis;
- a lifting mechanism configured for raising and lowering the carrier, wherein the lifting mechanism comprises a lifting drive with at least one lifting cylinder configured for raising the first and/or second carrier part;
- wherein the at least one lifting cylinder is mounted at a mounting distance from the respective longitudinal central axis of the respective carrier part.

The vehicle elevator comprises a carrier having two carrier parts. These two carrier parts may extend substantially parallel relative to each other. The two carrier parts can be physically separated or can be connected with an intermediate beam, jacking beam, rod, platform et cetera.

The lifting mechanism preferably comprises a half-scissor configuration having a Y-shape or inverted Y-shape. It will be understood that the lifting mechanism in some embodiments may relate to another mechanism, such as a (full) scissor mechanism or any other suitable mechanism. Also, other configurations can be envisaged in accordance with the present invention.

The lifting mechanism further comprises a lifting cylinder. Preferably, the lifting cylinder is a hydraulic cylinder. It will be understood that also other cylinder types, such as electric and pneumatic cylinders, can be envisaged in accordance with the present invention.

Preferably, each carrier part is provided with at least one lifting mechanism, and in a presently preferred embodiment at or near each end of these carrier parts there is provided a (separate) lifting mechanism. Preferably, the lifting mechanisms that are provided at or near both ends are provided with separate lifting cylinders.

In a presently preferred embodiment two carrier parts are extending parallel to each other with in total four lifting mechanisms and four hydraulic cylinders. This enables an effective and efficient lifting of vehicles, including heavy vehicles such as busses and trucks. In this embodiment the lifting cylinders in the respective lifting drives interact to enable a synchronous lifting or lowering of the carrier and carrier parts.

According to the invention the at least one lifting cylinder is mounted at a mounting distance relative to the respective longitudinal central axis of the respective carrier part that extends in the longitudinal direction. By providing the at least one lifting cylinder, in particular its central axis, at a mounting distance from the longitudinal central axis a bending or torsion movement of the carrier part towards the other carrier part is largely prevented or at least significantly reduced. Such bending or torsion movement is a result of the load of a vehicle being distributed over preferably two carrier parts that each carry a side of the vehicle. Preferably, the lifting cylinder is mounted at a mounting distance towards the other carrier part in an embodiment of a vehicle elevator having two carrier parts extending parallel to each other.

As a further advantage, providing the mounting distance may also reduce the need for over-dimensioning the relevant parts of the vehicle elevator. Therefore, this provides a safe, robust and cost-effective vehicle elevator.

Mounting the lifting cylinder at a mounting distance from the respective longitudinal central axis of the respective carrier part can be considered as an asymmetrical mounting of the lifting cylinder relative to the respective carrier part.

In a presently preferred embodiment of the invention the mounting distance is at least 2.5 cm, more preferably at least 5 cm, and is most preferably at least 7.5 cm. Such minimal mounting distance provides a guaranteed level of stability and robustness to the vehicle elevator.

In addition, or as an alternative thereto, the mounting distance preferably lies in the range of 2.5 to 25 cm, more preferably in the range of 2.5 to 15 cm, and lies most preferably in a range of 2.5 to 10 cm. This further improves the robustness of the vehicle elevator, and more particularly guarantees a certain counter measure against any undesired bending or rotational movement of the vehicle part in response to a (heavy) vehicle, for example. This provides additional safety to the vehicle elevator.

In a presently preferred embodiment of the invention the vehicle elevator further comprises a floor connector having a floor shaft, a rotatable rod that extends between the floor connector and the carrier, wherein the rotatable rod comprises a tubular profile that extends over at least a part of the length of the rotatable rod.

The floor connector connects the lifting mechanism to the workshop floor. Providing the rotatable rod with a tubular profile gives additional strength and stability to the lifting mechanism and to the vehicle elevator as a whole. Such tubular profile may have any suitable shape, including circular, oval, rectangular and/or any other shape or combination thereof.

Preferably, the tubular profile extends from the floor connector to the lower end of the lifting cylinder. More preferably, the tubular profile is configured as a cable tray. This enables providing the cables, including hoses, to and/or from the lifting cylinder in the tubular profile, thereby contributing to a clean and safe vehicle elevator.

Preferably, the tubular profile is provided as a unitary profile with the rotatable rod of the lifting mechanism. In a presently preferred embodiment, there are provided two rods that extend parallel to each other with the lifting cylinder being mounted between the two rods. Due to the asymmetric mounting of the lifting cylinder the lifting cylinder is positioned closer to one rod. Preferably, the tubular profile is positioned at or close to the rod that is positioned at the larger distance from the lifting cylinder. This guarantees sufficient space for the tubular profile. Also, the tubular profile contributes to the strength of this rod that under certain circumstances is confronted with higher loads as compared to the other rod.

In a further preferred embodiment of the invention the vehicle elevator further comprises a connection rod extending between a first end connected to the rotatable rod at a connection shaft and a second end connected to the carrier part at a piston shaft, and having a length that is larger than the distance between the connection shaft and the floor shaft.

Providing the connection rod with an extended length positions the piston shaft outside, i.e. beyond, the floor shaft. This enables a more compact construction for the lifting mechanism. More specifically the width of the lifting mechanism can be reduced even further. Also, this provides additional space for the tubular profile that provides additional strength and may act as a cable tray. This further improves the cost efficiency of the lifting mechanism and the vehicle elevator that is provided therewith.

In a further preferred embodiment of the invention the vehicle elevator further comprises a toothing configured for securing the elevator, and a side plate configured for at least partly covering the toothing.

Providing a securing element such as a toothing improves the safety when working with a vehicle elevator. Providing a cover plate or side plate that at least partly covers this toothing further improves the safety when working with the vehicle elevator. In addition, such cover plate or side plate contributes to the stability of the vehicle elevator.

The invention further also relates to a method for lifting of vehicle, with the method comprising the steps of:

providing a vehicle elevator in an embodiment of the present invention; and lifting the vehicle.

The method provides similar effects and advantages as described in relation to the vehicle elevator.

Optionally, two adjacent carrier parts are permanently or temporarily connected. Such connection between two adjacent carrier parts can be achieved with a so-called jacking beam that can be used when necessary.

BRIEF DESCRIPTION OF THE DRAWINGS

Further advantages, features and details of the inventions are elucidated on the basis of preferred embodiments thereof, wherein reference is made to the accompanying drawings, in which.

DESCRIPTION OF THE INVENTION

Figure 1:
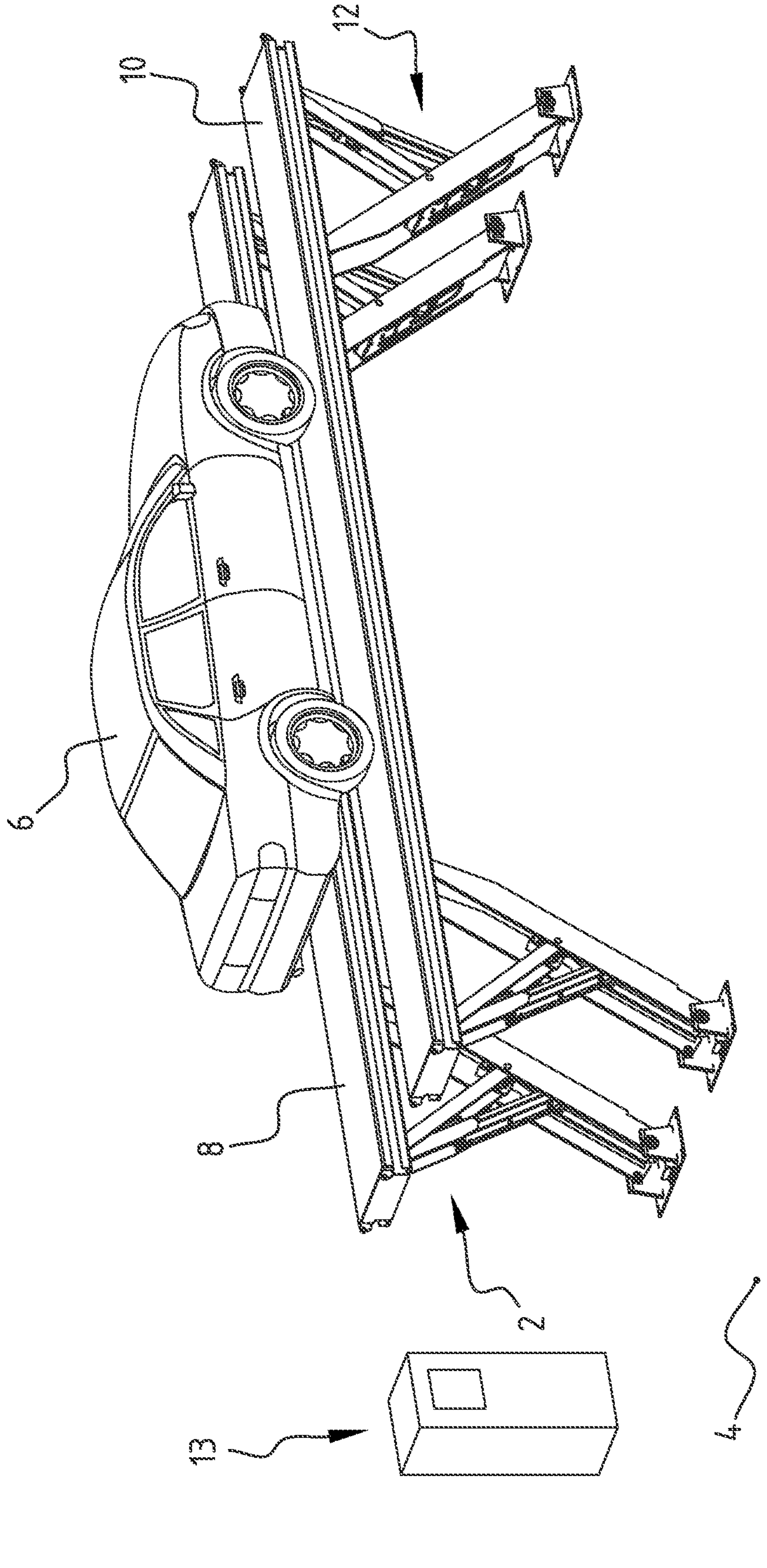
FIG. 1 shows a vehicle elevator according to the present invention.

Vehicle elevator 2 (FIG. 1) is mounted on workshop floor 4. Elevator 2 is capable of lifting vehicle 6 that is carried by first carrier part 8 and second carrier part 10. It will be understood that carrier parts 8, 10 can be connected by a jacking beam (not shown), or any other suitable connecting element. Such element can be removed if not necessary and/or can be embodied as a unitary platform.

Lifting mechanism 12 is capable of lifting and/or lowering carrier parts 8,10. Lifting mechanism 12 is controlled with control unit 13. It will be understood that it is also possible to control lifting mechanism 12 with an alternative controller, such as a tablet, computer, mobile phone et cetera.

Figure 2:
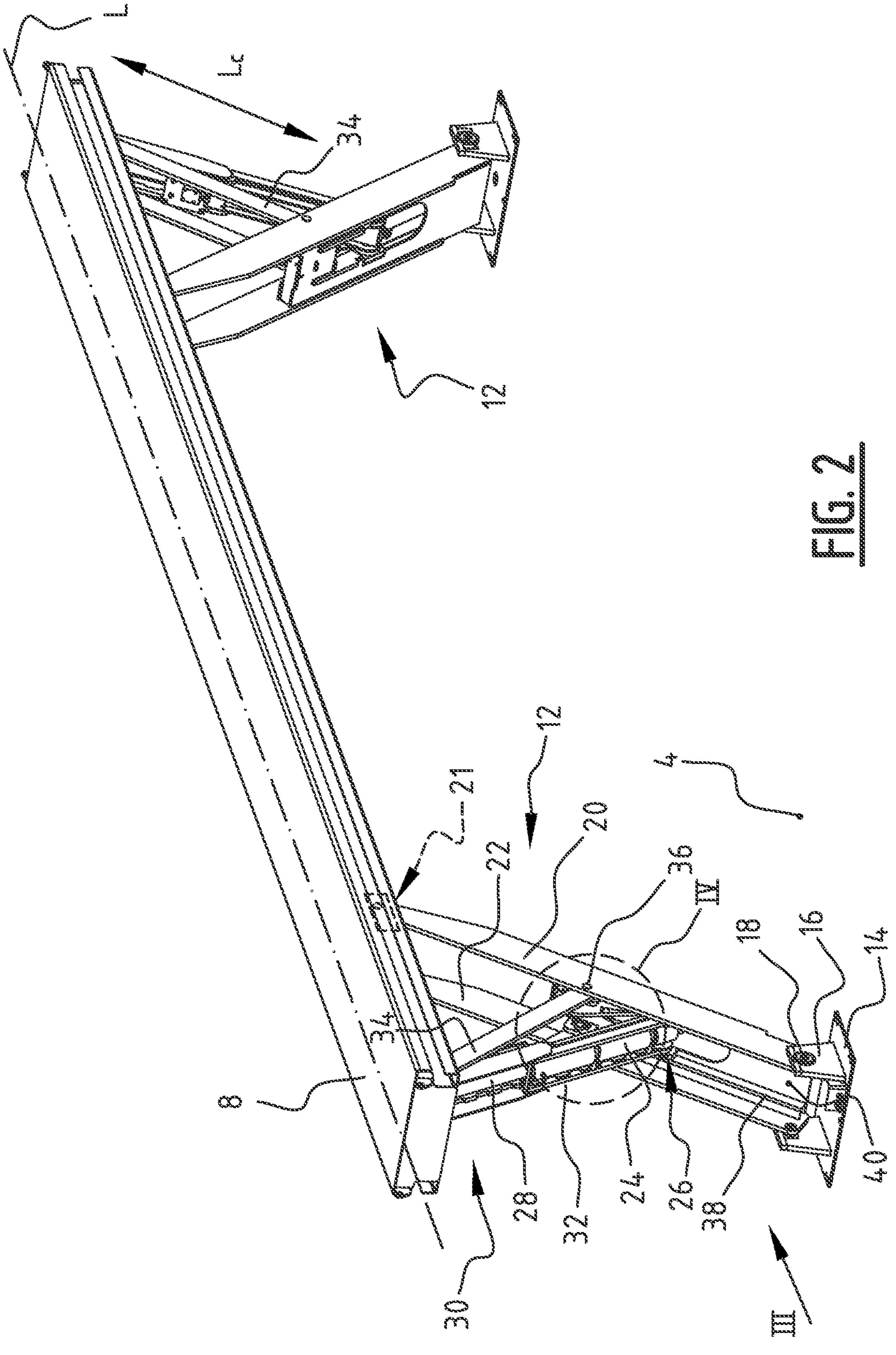
FIG. 2 shows a carrier part of the vehicle elevator FIG. 1.

Carrier part 8 (FIG. 2) has a central axis L that extends in the longitudinal direction of carrier part 8. Also carrier part 10 has a similar central axis. Lifting mechanism 12 is connected to workshop floor 4 with ground plate 14, flanges 16 and shaft or shaft elements 18. Rods 20, 22 are capable of rotating around floor shaft 18. Shaft 18 can be embodied as a unitary shaft extending through both rods 20, 22 or can alternatively be embodied as two separate sub-shafts or shaft elements 18. On the other end of rods 20, 22 sliding blocks 21 are provided that enable movement of this other end in the longitudinal direction L of carrier part 8 during lifting or lowering of carrier part 8.

In the illustrated embodiment hydraulic cylinder 24 is connected to shaft 26. Shaft 26 is connected to rods 20, 22 and preferably extends between rods 20, 22. Piston 28 of cylinder 24 is at its outer end rotatably connected to piston shaft 30 that is directly or indirectly connected to carrier part 8. In the illustrated embodiment cylinder 24 is mounted in frame 32. Connection rods 34 preferably extend between connection shaft 36 and piston shaft 30.

Tube 38 extends between shaft 26 and shaft 18. In this illustrated embodiment tube 38 is configured for guiding cables and/or hoses to and/or from cylinder 24. In the illustrated embodiment plate 40 is provided between two two rods 20, 22.

Also, in the illustrated embodiment lifting mechanism 12 is embodied as half-scissor mechanism, and more particularly a Y-configuration. It will be understood that similar configurations can also be envisaged in accordance to the present invention, including an inverted Y-configuration and a full scissor or X-configuration.

Figure 3:
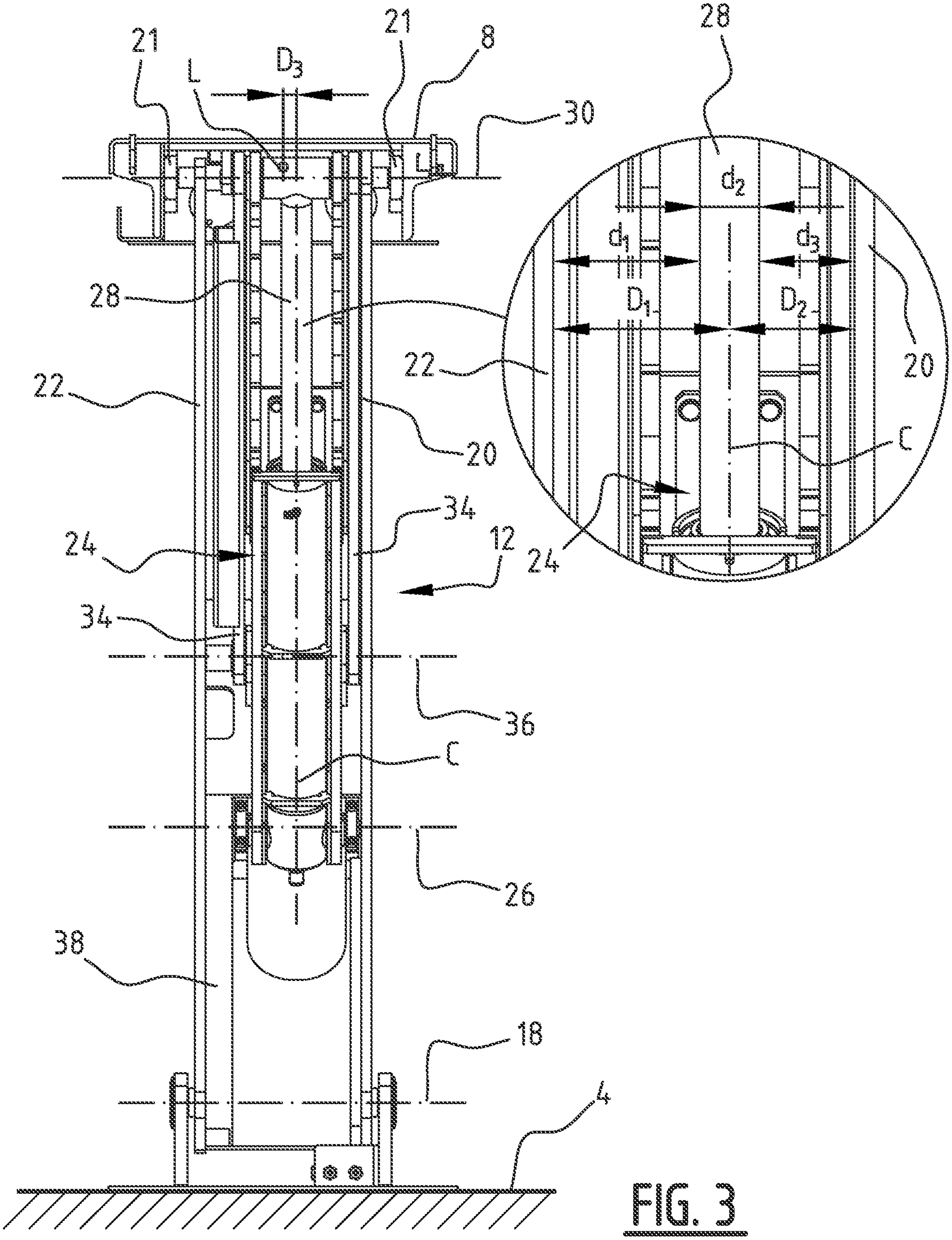
FIG. 3 shows a front view of the lifting mechanism of FIG. 2.

Cylinder 24 (FIG. 3) has central axis C. In the illustrated embodiment cylinder 24 has outer diameter d2 that is positioned at distance d1 from rod 22 and at distance d3 from rod 20. Central cylinder axis C is provided at distance D1 from rod 22 and distance D2 from rod 20. In this embodiment central axis C of cylinder 24 is provided at a distance D3 of the longitudinal axis L of carrier part 8 as seen in a horizontal direction.

Figure 4A:
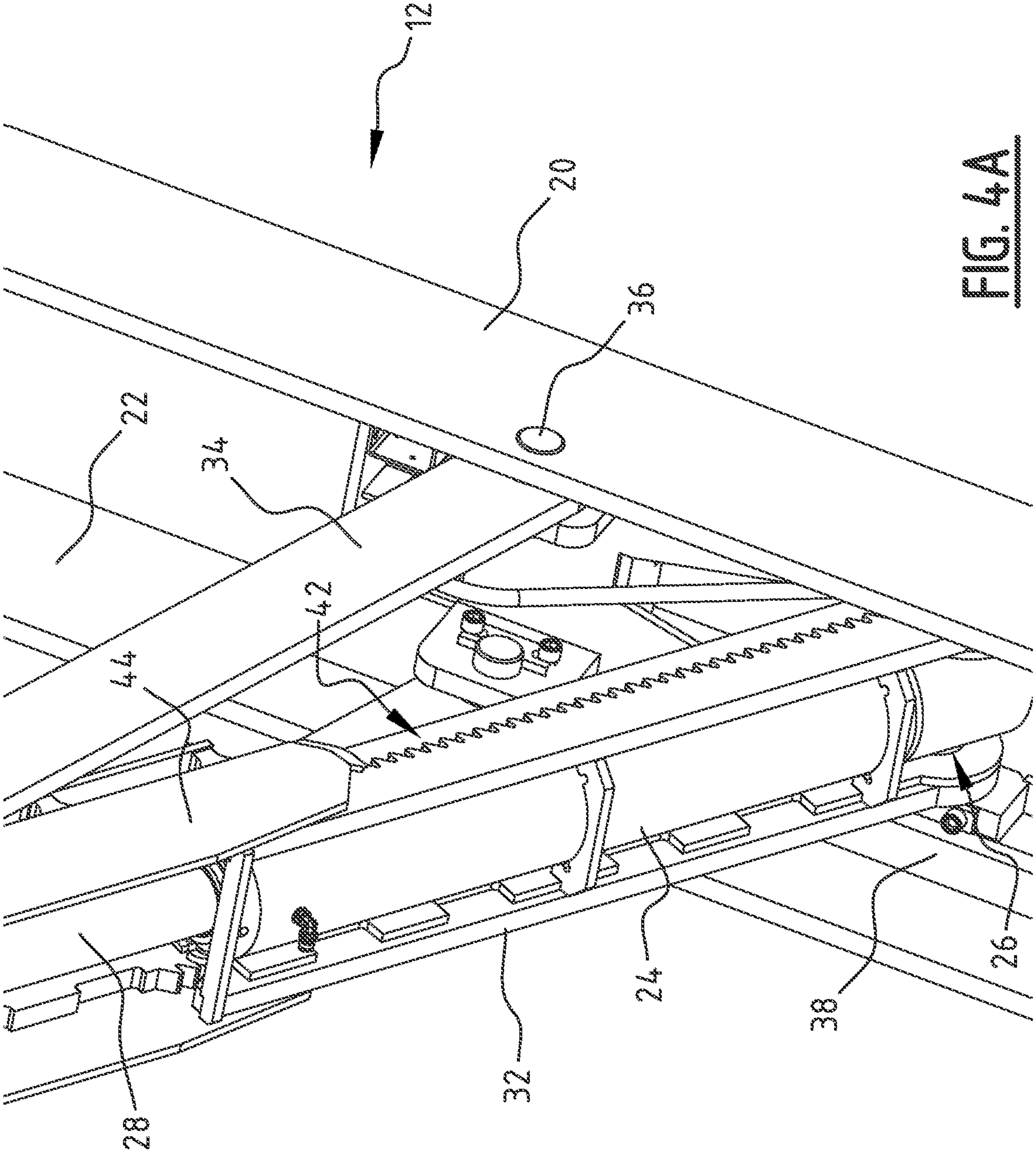
FIGS. 4A-B shows the toothing of the lifting mechanism of FIG. 3.
Figure 4B:
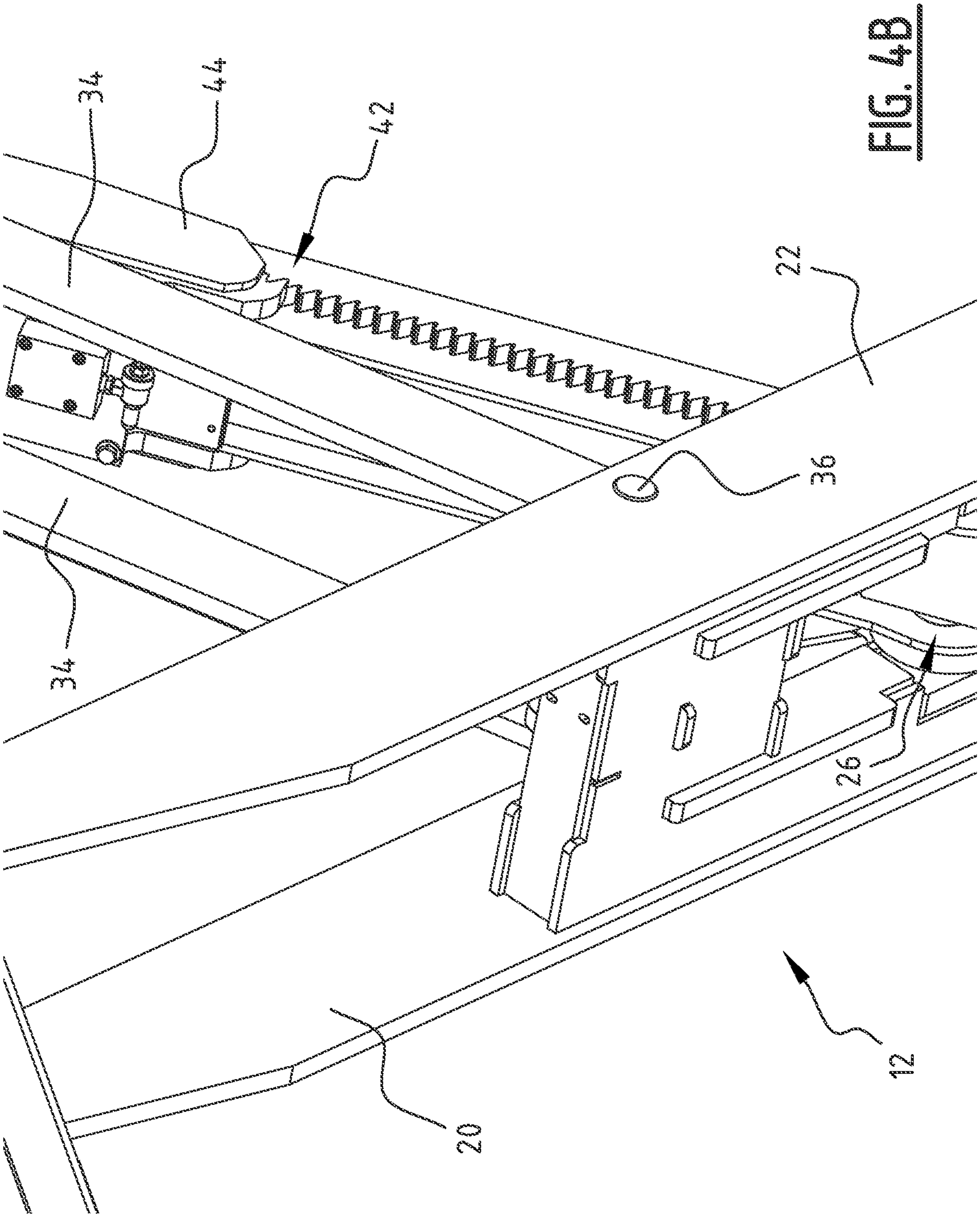

In the illustrated embodiment lifting mechanism 12 (FIGS. 4A-B) is provided with a toothing 42 to secure lifting mechanism 12 in a lifting operation. Cover or side plate 44 at least partly covers toothing 42.

Figure 5:
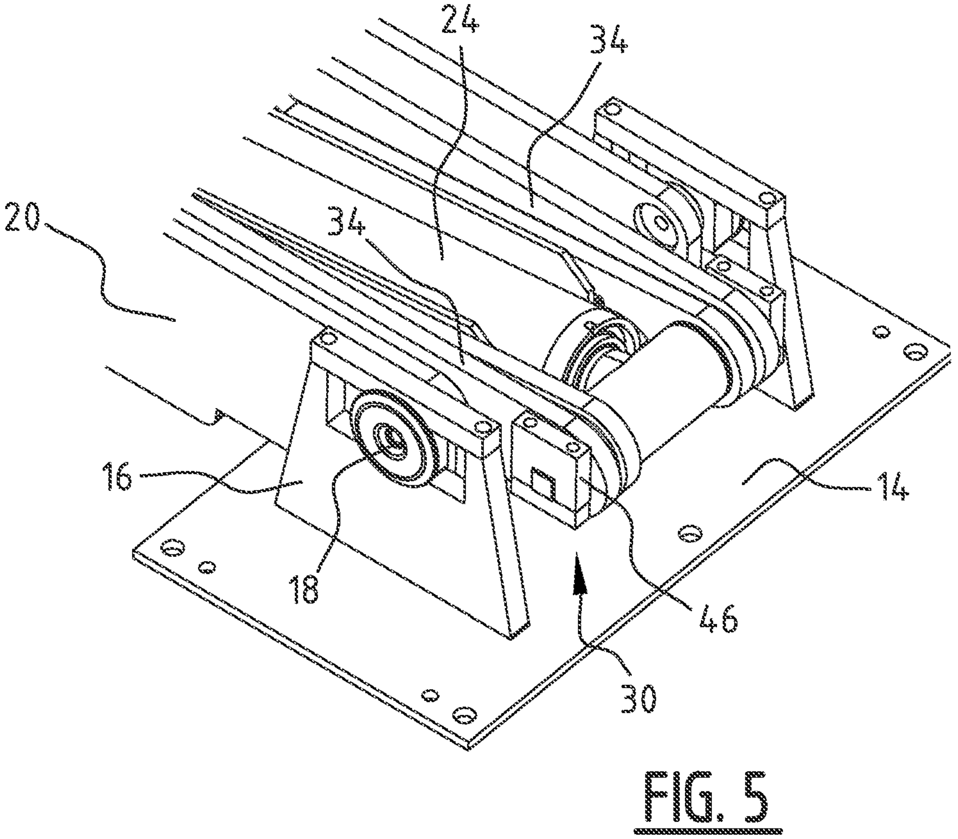
FIG. 5 shows the connection rod extending beyond the floor shaft in a folded state of the vehicle elevator of FIGS. 1-4.

In a preferred embodiment of the invention connection rods 34 (FIG. 5) have a length $L_c$ that is larger than the distance between shafts 18, 36 such that piston shaft 30 lies beyond shaft 18 in a folded state of vehicle lift 2. Connectors 46 connect piston shaft 30 to carrier part 8. In this illustrated embodiment cylinder 24 and rods 34 may both rotate around the shaft. Alternatively, the cylinder or the rods are fixedly connected to the shaft.

For lifting vehicle 6 the vehicle is moved on carrier parts 8, 10. After vehicle 6 is correctly positioned an authorized operator may control lifting mechanisms 12 with control unit 13 and lift vehicle 6 from workshop floor 4. After inspection, maintenance, repair or other operation vehicle 6 can be lowered by lowering lifting mechanism 12, preferably using control unit 13. As soon as vehicle elevator 2 has returned to the ground vehicle 6 can be moved away from vehicle elevator 2. Vehicle elevator 2 is then ready for accepting a new lifting operation.

The present invention is by no means limited to the above described preferred embodiments thereof. The rights sought are defined by the following claims within the scope of which many modifications can be envisioned.

The invention claimed is:

1. A vehicle elevator for lifting a vehicle, the elevator comprising:

a carrier configured for lifting the vehicle, wherein the carrier comprises a first and a second carrier part each extending in a longitudinal direction and each having a longitudinal central axis; and a lifting mechanism configured for raising and lowering the carrier, wherein the lifting mechanism comprises a lifting drive at each end of the first carrier part and the second carrier part, each lifting drive having a single lifting cylinder configured for raising the first and/or second carrier part; and wherein the single lifting cylinder of each lifting drive is mounted at a mounting distance from the longitudinal central axis of the respective carrier part.

2. The vehicle elevator according to claim 1, wherein each end of the carrier parts is provided with a separate lifting mechanism.

3. The vehicle elevator according to claim 2, further comprising a floor connector having a floor shaft, a rotatable rod that extends between the floor connector and the carrier, wherein the rotatable rod comprises a tubular profile that extends over at least a part of the length of the rotatable rod.

4. The vehicle elevator according to claim 3, wherein the tubular profile is configured as a cable tray.

5. The vehicle elevator according to claim 4, wherein the tubular profile at least extends between the floor connector and the lifting cylinder.

6. The vehicle elevator according to claim 3, further comprising a connection rod extending between a first end connected to the rotatable rod at a connection shaft and a second end connected to the carrier part at a piston shaft, and having a length that is larger than the distance between the connection shaft and the floor shaft.

7. The vehicle elevator according to claim 6, further comprising a toothing configured for securing the elevator, and a cover plate configured for at least partly covering the toothing.

8. The vehicle elevator according to claim 1, wherein the mounting distance is at least 2.5 cm.

9. The vehicle elevator according to claim 8, wherein the mounting distance is in the range of 2.5 to 25 cm.

10. The vehicle elevator according to claim 1, further comprising a floor connector having a floor shaft, a rotatable rod that extends between the floor connector and the carrier, wherein the rotatable rod comprises a tubular profile that extends over at least a part of the length of the rotatable rod.

11. The vehicle elevator according to claim 10, wherein the tubular profile is configured as a cable tray.

12. The vehicle elevator according to claim 10, wherein the tubular profile at least extends between the floor connector and the lifting cylinder.

13. The vehicle elevator according to claim 10, further comprising a connection rod extending between a first end connected to the rotatable rod at a connection shaft and a second end connected to the carrier part at a piston shaft, and having a length that is larger than the distance between the connection shaft and the floor shaft.

14. The vehicle elevator according to claim 1, further comprising a toothing configured for securing the elevator, and a cover plate configured for at least partly covering the toothing.

15. The vehicle elevator according to claim 1, wherein the mounting distance is at least 5 cm.

16. The vehicle elevator according to claim 1, wherein the mounting distance is at least 7.5 cm.

17. The vehicle elevator according to claim 1, wherein the mounting distance is in the range of 2.5 to 15 cm.

18. The vehicle elevator according to claim 1, wherein the mounting distance is in the range of 2.5 to 10 cm.

19. A vehicle elevator for lifting a vehicle, the elevator comprising:

a carrier configured for lifting the vehicle, wherein the carrier comprises a first and a second carrier part each extending in a longitudinal direction and each having a longitudinal central axis; and a lifting mechanism configured for raising and lowering the carrier, wherein the lifting mechanism comprises a lifting drive at each end of the first carrier part and the second carrier part, each lifting drive having a single lifting cylinder configured for raising the first and/or second carrier part;

wherein the single lifting cylinder of each lifting drive is mounted at a mounting distance from the longitudinal central axis of the respective carrier part, wherein each end of the carrier parts is provided with a separate lifting mechanism, and wherein the mounting distance is at least 2.5 cm.

20. A method for lifting a vehicle, the method comprising the steps of:

(a) providing a vehicle elevator comprising:

a carrier configured for lifting the vehicle, wherein the carrier comprises a first and a second carrier part each extending in a longitudinal direction and each having a longitudinal central axis; and a lifting mechanism configured for raising and lowering the carrier, wherein the lifting mechanism comprises a lifting drive comprises a lifting drive at each end of the first carrier part and the second carrier part, each lifting drive having a single lifting cylinder configured for raising the first and/or second carrier part; and wherein the single lifting cylinder of each lifting drive is mounted at a mounting distance from the longitudinal central axis of the respective carrier part; and (b) lifting the vehicle.

* * * * *